Oct. 29, 1968

A. KOLLER ET AL 3,408,527

HIGH ENERGY PLASMA CONTAINMENT DEVICE UTILIZING
ALTERNATE Z AND θ PINCHES

Filed June 12, 1964

3,408,527
HIGH ENERGY PLASMA CONTAINMENT DEVICE UTILIZING ALTERNATE Z AND θ PINCHES
Alois Koller and Alfred Michel, Erlangen, Germany, assignors to Siemens Aktiengesellschaft, Erlangen, Germany, a German corporation
Filed June 12, 1964, Ser. No. 374,617
Claims priority, application Germany, June 14, 1963, S 85,669
8 Claims. (Cl. 313—156)

Our invention relates to methods and means for producing extremely high temperatures such as for plasma research purposes.

The methods for confining a plasma by a magnetic field may be divided into two large groups comprising stationary and non-stationary methods. Included in the stationary group are the methods based on the magnetic mirror concept, those based on the cusped-geometry concept, the stellarator and those based on rotating plasma. Among the latter, are confining methods involving the z-pinch and the theta-pinch.

In a cylindrical and in a toroidal plasma discharge vessel, the z-pinch current in the plasma flows parallel to the axis of the discharge vessel. The magnetic field is azimuthal or circular. The z-inch subjects the plasma to a radial force, perpendicular to the axis of the discharge vessel.

In a cylindrical and in a toroidal plasma discharge vessel, the θ-pinch current in the plasma is azimuthal. The magnetic field is axial. The θ-pinch, as the z-pinch, subjects the plasma to a radially directed force.

The confining interval of the stationary methods is limited by diffusion transverse to the magnetic field, by particle losses at the mirror ends and by instabilities, these limits being in the order of magnitude of milliseconds. The particle densities with these methods are very small such as, for example, about $10^{10}$ to $10^{12}$ cm.$^{-3}$ The non-stationary confining methods result in higher particle densities such as, for example, about $10^{15}$ to $10^{18}$ cm.$^{-3}$, but in smaller confining intervals of about $10^{-6}$ to $10^{-5}$ sec. The pinch effects involve the occurrence of instabilities.

Various methods for confining plasmas of high energy have become known. According to one of these methods, which is that disclosed in German patent No. 1,116,834, a high-temperature plasma is produced in a long and essentially cylindrical, evacuated reaction vessel. Electrons are accelerated outside of the vessel to relativistic speed, and these electrons are tangentially introduced into the vessel at a small angle to a plane orthogonal to the magnetic field, and are guided into a path extending within the vessel on a geometrical cylinder surface coaxial with the vessel. When the magnetic field strength at the point of injection is varied, the electrons are caught and then pass through the vessel in parallel relation to the axis and away from the injection point, thus resulting in a cylindrical layer of electrons that rotate about the axis of the magnetic field at relativistic speed. Atoms of relatively low atomic weight are preferably injected into the reaction vessel.

A device for producing and constricting a plasma of high energy is described in the German published patent application No. 1,117,789. The described device comprises a ring-shaped reaction chamber and limits the plasma by a central electrode and by a coaxial ring-shaped electrode radially spaced from the central electrode. A high-energy source of high-voltage pulses is connected with the electrodes for ionizing the gaseous reaction medium. A magnet is provided for producing a circulating particle path around the center electrode and for heating the plasma; the lines of force issuing from the magnet traversing the ring-shaped chamber and extending at an angle, preferably perpendicularly, to the ring-shaped chamber.

A device for producing and maintaining a high-energy plasma is known from German published patent application No. 1,111,747. The described device comprises means for producing a discharging current in the plasma chamber. The current results in a magnetic field extending concentrically to the magnet. The current and the magnetic field are variable with respect to direction and intensity. The device is provided with means for producing an additional magnetic field in the chamber, the latter field varying in direction and magnitude with respect to the concentric magnetic field so that the coaction between the concentric and the additional magnetic fields results in imposing a continuous confining pressure upon the plasma. This device is predicated upon the concept of having the confining interval in a non-stationary method prolonged by a periodic alternation of z-pinch and θ-pinch.

Attempts have been made toward realizing the just-mentioned concept, but have failed because of unfavorable correlation between the two magnetic fields. Particularly, the superposition of the circular magnetic field for the z-pinch with the axial magnetic field of the θ-pinch results in a helical field and consequently in instabilities of the helical path. Calculation and experiments made by Van der Laan and Rietjens, noted in Nuclear Fusion Supplement, 1962, Part 2, page 693, further indicate the existence of an unstable z-pinch phase.

Judging from the present state of development, there appears the problem of properly joining or correlating the θ-pinch to the z-pinch, and vice versa. If the time sequence of the two pinch phases is accurately controlled, this will afford the possibility of alternating repetition and thus of a non-stationary confinement during prolonged periods of time. It follows from the failure of the attempts heretofore made, that an unfavorable coaction of the two magnetic fields must be avoided.

The present invention, relating to the production and confinement of a high-energy plasma by means of alternating z- and θ-pinch discharges in a cylindrical or toroidal discharge vessel, has for its object to overcome the aforementioned difficulties and failures, and to afford an improved coaction and control of the two pinch phases.

To this end, and in accordance with a feature of our invention, a magnetic-field-free inertia phase is produced each time between two successive z-pinch and θ-pinch phases.

A "magnetic-field-free inertia phase" as understood in this specification may be explained as follows. In order to prevent superposition or another unfavorable coaction of the two magnetic fields caused respectively by the z-pinch and the θ-pinch, the magnetic field stemming from each preceding discharge is to have substantially decayed before the next discharge commences. Together with the magnetic field, a portion of the confining forces vanishes. From our own investigations, we have become aware of the fact that at least with a linear z-pinch, the inertia forces contribute an essential portion to the confinement of the plasma. This confining phase, based only upon the inertia forces, is called "magnetic-field-free inertia phase."

According to another feature of the invention, we produce the magnetic-field-free inertia phase by short-circuiting the discharge current of the next-preceding pinch prior to commencing the flow of discharge current of the following pinch. Suitable for short-circuiting the discharge current are, for example, spark gaps of short quenching intervals, or other controlled gas discharge gaps such as thyratrons. If the θ-pinch is to immediately follow the z-pinch, the z-current must be switched off at a suitable moment of the contraction phase. The plasma then continues contracting on account of its inertia, the outer particles partly commencing to reverse their direction. The circular magnetic field which during this interval is in its decaying stage still has a compressing effect. Before a substantial amount of the plasma has reached the wall of the discharge vessel, the θ-pinch must commence, and this pinch then encounters a plasma under conditions free of a magnetic field.

If the z-pinch is to immediately follow a θ-pinch, the θ-current must be switched off at a suitable moment so that the axial magnetic field can decay. To the extent possible, the θ-pinch should not contain an enclosed magnetic field because a mixing of magnetic fields is to be avoided. In the following interval of time, during which the axial magnetic field decays, before an appreciable portion of the plasma can reach the vessel wall, a z-current is to be switched on in order to again cause compression of the plasma.

Another method for producing the field-free inertia phase according to the invention is to critically attenuate the discharge current within a sufficiently short interval of time by means of a suitable resistance in the external circuit. This is achieved by inserting into the discharging circuit a resistor whose magnitude of resistance R satisfies the condition:

$$R = 2 \cdot \sqrt{\frac{L}{C}}$$

wherein L denotes the total inductivity of the discharging circuit, and C is the capacitance of the discharging capacitors. This method has the advantage that the aforementioned short-circuiting devices can be dispensed with.

The method of the invention is essentially based upon the phenomenon that Lorentz forces exert their most important effect as long as the plasma is situated near the edge of the discharge vessel. It suffices therefore that the Lorentz forces are effective during these intervals of time. At smaller radii, the plasma is then left subject to its inertia forces. The purpose of the magnetic field is not to impose a continuous pressure upon the plasma column, but rather to impart to the plasma periodically and pulse-wise acceleration in the radially inverse direction whenever the plasma reaches the vicinity of the vessel wall. Compared with the heretofore known methods for the confinement of plasma according to which the magnetic field fills the entire plasma-free space, the pulse-wise operation just mentioned is tantamount to a reduction of the required energy supplied.

The periodic alternation of the two-pinch effects with intermediate magnetic-field-free inertia phases constitutes an effective method for preventing or reducing kink,- hose-, helix-, and flute-type instabilities. Such instabilities always occur when irregularities are formed perpendicularly to the magnetic field lines, and they act destructively upon the confinement only after the compression of the plasma is completed. Irregularities lengthwise of the magnetic field lines can become compensated or equalized by Alfvén waves.

Alfvén waves are described in "Cosmic Electrodynamics," by H. Alfvén, Chapter IV, Clarendon Press, Oxford, 1950, and "Physics of Fully Ionized Gases," by L. Spitzer, Jr., second edition, 1962, pages 61 to 67, Interscience Publishers, New York. Alfvén waves are transverse hydrodynamic waves in a plasma and may be considered electromagnetic waves in a gas with a very high dielectric constant. In principle, an Alfvén wave is a vibration of a magnetic field line along which the vibration expands in the plasma at the Alfvén speed. The prototype of an Alfvén wave is a vibration which expands in a taut wire.

If an instability occurs during the z-pinch in the axial plasma current path, the instability is surrounded in the z-pinch by an azimuthal magnetic field, which amplifies such instability. If, however, the z-pinch field is removed and a θ-pinch field, which is axially directed, is applied to the plasma, the instability expands along the axial magnetic field lines of the θ-pinch. The expansion is at the Alfvén speed and is a damping vibration. The damping has a stabilizing effect, as stated hereinbefore and hereinafter.

In the method according to the invention, the destructive effect of the instabilities can no longer occur because the compressing magnetic field no longer exerts an appreciable effect at the moment of the strongest contraction. There is a possibility that irregularities perpendicular to the magnetic field lines, inevitably occurring during the compression phase, may be smoothed in the next-following compression phase, because then the magnetic field lines are turned 90° and the previously formed irregularities can then be equalized along the field lines by Alfvén waves.

In order that the present invention may be readily carried into effect, it will now be described with reference to the accompanying drawing, wherein.

Figure 1:
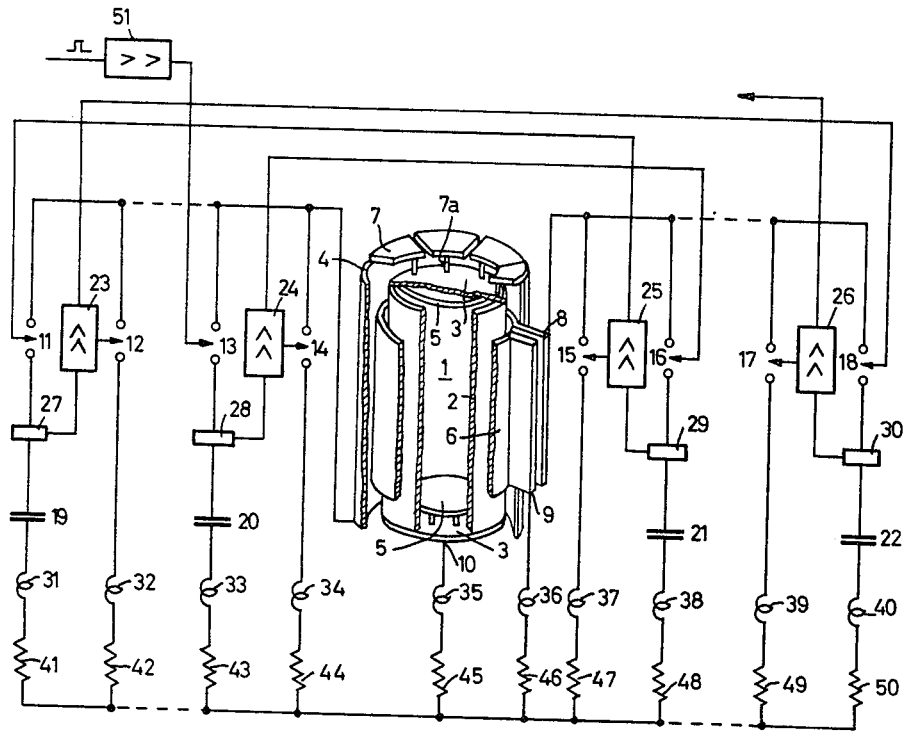
FIG. 1 is a schematic, partly sectional perspective view of an embodiment of a device for producing and confining high-energy plasma, in accordance with the present invention, together with the appertaining electric circuitry.

In FIG. 1, a cylindrical discharge vessel 1 comprises an insulating tubular jacket 2 and two insulating end plates 3. The jacket 2 is coaxially surrounded by a cylindrical, slitted current supply member 4 of metal for producing the z-pinch. A metallic, radially slitted, ring 7 is joined to the top of the cylindrical current supply member 4. A metallic cylindrical coil, forming only a single turn 6, for producing the θ-pinch, is coaxially disposed between the jacket 2 and the cylindrical member 4. The ring 7 is provided with metallic pins 7a which are in good electrical contact with an upper discharge electrode 5 through the upper cover plate 3. The upper discharge electrode 5 is sealed vacuum-tight in the interior of the vessel 1.

The two ends of the single turn of the θ-pinch coil 6 extend radially away and the electric current is supplied through the resulting terminal portions 8 and 9 of said coil 6. The current for the z-pinch leaves the member 4 at 10 through the lower discharge electrode 5. Spark gaps 11 to 18 are connected to respective capacitors 19 to 22 and are controlled by commercially available time delay devices 23 to 26. The circuit arrangement further comprises inductive voltage transmitters 27 to 30 for the delay devices 23 to 26, conductance inductivities or inductances 31 to 40, ohmic resistances 41 to 50, and a commercially available pulse generator 51 which furnishes a square-wave pulse.

The arrangement of FIG. 1 operates as follows. A start signal from the pulse generator 51 ignites the spark gap 13. The capacitor 20 discharges through the cylindrical discharge vessel 1 and produces a z-pinch. The inductivity 35 and the ohmic resistance 45 denote the inductivity and resistance of the discharge vessel up to electrodes 5. The inductivity 33 and the ohmic resistance 43 denote the inductivity and resistance respectively of the external circuit consisting essentially of the capacitor means, the spark gap and the electric connecting leads. The discharge of capacitor 20 furnishes an input signal, produced by the inductive voltage transmitter 28. The voltage transmitter 28, which may be designed for example as a Rogowski belt or current transformer, furnishes an input signal to the time delay device 24. The time delay device 24 produces two output pulses which are delayed for different intervals of time. The first delayed pulse triggers the short-circuiting spark gap 14 in the circuit of the inductivity 34 and the resistance 44. The second pulse, following after additional delay, triggers the spark gap 16 and thus causes the capacitor 21 to discharge through the θ-pinch coil 6 which produces a θ-pinch.

A discharging current of capacitor 21 also produces in the inductive voltage transmitter 29 an input signal for the time delay device 25. The time delay device 25 produces two output pulses differently delayed with respect to the input signal. The first delayed pulse from the time delay device 25 triggers the short-circuiting spark gap 15. The second, additionally delayed, pulse from the time delay device 25 triggers the next-following z-pinch circuit through the spark gap 11. The capacitor 19 then discharges through the cylindrical discharge vessel 1 and again produces a z-pinch.

The discharge of the capacitor 19 also furnishes an input signal through the inductive voltage transmitter 27 to the time delay device 23 which again produces two differently delayed output pulses. The first delayed output pulse triggers the short-circuiting spark gap 12 in the circuit of inductivity 32 and resistance 42. The second, additionally delayed, output pulse triggers the spark gap 18 and thus causes the capacitor 22 to discharge through the θ-pinch coil 6, thus again producing a θ-pinch. The discharging current of capacitor 22 also furnishes through the inductive voltage transmitter 30 an input pulse to the time delay device 26 which issues two differently delayed output pulses. The first output pulse triggers the short-circuiting spark gap 17 in the circuit of inductivity 39 and resistance 49. The second, additionally delayed, output pulse triggers another z-pinch circuit, not illustrated.

In the illustrated embodiment, the capacitance of the discharging capacitors 19 to 22 is approximately 20 μf. each. A voltage of 20 kv. is applied between the discharge electrodes for the z-pinch as well as at the θ-pinch coil. The discharge current is 200 ka. The resistances 41 to 50, with the exception of 45, are each 0.1 ohm. The resistance 45 is purely a resistance of the connecting leads. The discharge vessel proper consists of glass and has a length of 50 cm. and a diameter of 20 cm. It is filled with deuterium gas at a pressure of 3 torr. The quenching periods of the spark gaps employed are $2 \cdot 10^{-5}$ sec.

For improving the reproducibility of the $n^{th}$ repetition, it is advisable to operate not with fixedly predetermined delay, but to take the signal for igniting each next-following discharge from the plasma itself. This signal can be furnished by a sensor or sensing device, for example, a probe, or from an optical sensing device. For igniting each next-following discharge, two conditions must be met: the optical or other probe signal and the pulse from the delay device of the preceding discharges must both be present. For example, the ignition of each following discharge can be performed by a circuit comprising a logical AND-circuit which furnishes an ignition signal only when both just-mentioned coincidence conditions are simultaneously satisfied.

Figure 2:
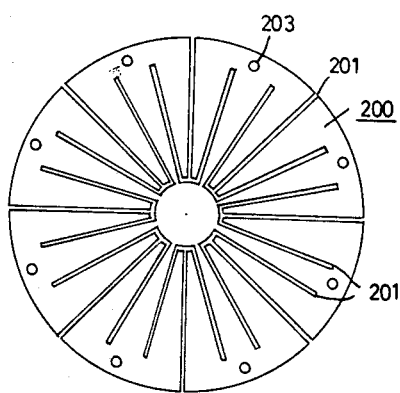
FIG. 2 is a plan view of an embodiment of a discharge electrode applicable in a device according to the invention.

FIG. 2 shows an example for an embodiment of the electrodes between which the discharge in the discharge vessel according to FIG. 1 takes place. Each electrode 5 consists essentially of a circular plate 200 made, for example of copper or a tugnsten-copper alloy. To prevent the energy of the θ-pinch from being consumed by eddy currents in the electrodes, each is provided with radial slits 201. Metal pins 203, corresponding to the pins 7a of FIG. 1, constitute the conductive connection with the current supply leads. The metal pins 203 pass vacuum-tightly through the insulating cover plates 3 (FIG. 1) which cover the insulating tubular jacket 2.

The invention is also applicable when employing a toroidal discharge vessel, in which the θ-pinch is produced in the aforedescribed manner and as known from available literature, reference also being had to copending patent application Ser. No. 349,996, filed Mar. 6, 1964 now Pat. No. 3,270,236 by A. Koller et al. and assigned to the assignee of the present invention. The field in the torus may have an $M+S$ configuration, according to Meyer and Schmidt. Such a field prevents the occurrence of toroidal drift phenomena. The term $M+S$ configuration is here used in the sense explained in the periodical, "Physical Review Letters," vol. 10 (1963), page 5. The z-pinch is produced without electrodes as an induction pinch. The current-conducting coils extend along the toroidal discharge vessels in orthogonal relation to the θ-pinch coils.

An $M+S$ configuration is a toroidal type plasma configuration which maintains a balance with an outside magnetic field, without the azimuthal current. The configuration is also known as a bumpy torus. The configuration was first described in Naturforschung (Natural Science Magazine) vol. 13a, 1958, pages 1005 to 1015.

It is essential to the $M+S$ configuration that the magnetic field lines be of equal length inside and outside the torus. Thus, in such magnetic field configuration, the density of the magnetic field lines is, on the average, equal on the inside and outside of the torus. This prevents the plasma in the torus from drifting radially to the outside. The stabilizing effect of the $M+S$ configuration is thus in the prevention of a plasma drift perpendicularly to the axis of the torus. In order to produce this configuration, the torus is developed in a manner whereby the azimuthal magnetic field lines are bumpier on the inside of said torus than on the outside and the accompanying flow lines cross the magnetic field lines orthogonally. The $M+S$ configuration may be obtained as indicated hereinafter.

The stabilizing effects of the Alfvén waves and of the $M+S$ configuration are completely independent from each other and are of a completely different nature. Despite this, however, Alfvén waves may also occur in an $M+S$ configuration. In such case, the stabilizing effect of the Alfvén waves would be added to the stabilizing effect of the $M+S$ configuration in the torus. Alfvén waves may appear in any form of plasma body, not just in tori.

Figure 3:
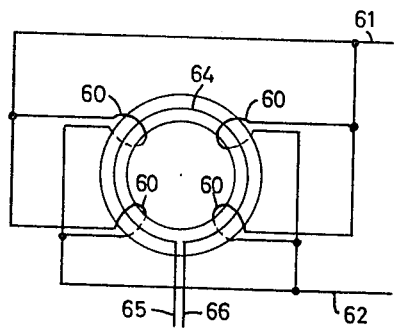
FIG. 3 is a schematic diagram of an embodiment of a toroidal discharge device suitable for the purposes of the invention.

A toroidal apparatus of the type described is schematically shown in FIG. 3, only a few of the coils being indicated. The windings 60 of the θ-coil and the windings 64 of the z-coil can be connected in parallel as shown in FIG. 3, in order to obtain a small coil inductivity and hence a steep ascending rate of the coil current. The current supply leads 61 and 62 of the θ-coil and the leads 65, 66 of the z-coil correspond to the connections 8, 9 and 4, 10 of FIG. 1. The toroidal device according to FIG. 3 can be operated for example with a circuit as shown in FIG. 1. For example, an $M+S$ configuration of the electromagnetic field in the toroidal discharge vessel can be obtained by having some of the windings 60 of the θ-coil, whose mutual spacing is in the order of magnitude of the torus tube diameter, traversed by a stronger current than the other windings of the θ-coil.

We claim:

1. Apparatus for producing and confining high energy plasma in a discharge vessel, comprising
   means for producing z-pinch discharges in said discharge vessel;
   means for producing θ-pinch discharges in said discharge vessel;
   circuit means connected to said z- and θ-pinch discharge producing means for alternately producing z-pinch and θ-pinch discharges in said discharge vessel; and
   further circuit means interconnected with said circuit means for producing in the plasma in said discharge vessel a magnetic-field-free inertia phase between each pinch discharge and the next-succeeding pinch discharge.

2. Apparatus for producing and confining high energy plasma in a discharge vessel, comprising
   magnetic coil means for producing z-pinch discharges in said discharge vessel when electrically energized with a discharge current;
   magnetic coil means for producing θ-pinch discharges in said discharge vessel when electrically energized with a discharge current;

circuit means connected to said z- and θ-pinch discharge producing magnetic coil means for alternately electrically energizing said magnetic coil means with a discharge current for alternately producing z-pinch and θ-pinch discharges in said discharge vessel; and further circuit means interconnected with said circuit means for short-circuiting the discharge current of each pinch discharge prior to the provision of the discharge current of the next succeeding pinch discharge for producing in the plasma in said discharge vessel a magnetic-field-free inertia phase between each pinch discharge and the next-succeeding pinch discharge.

3. Apparatus as claimed in claim 2, wherein said further circuit means comprises spark gaps coupled across said magnetic coil means.

4. Apparatus for producing and confining high energy plasma in a discharge vessel, comprising magnetic coil means for producing z pinch discharges in said discharge vessel when electrically energized with a discharge current;

magnetic coil means for producing θ pinch discharges in said discharge vessel when electrically energized with a discharge current;

circuit means connected to said z and θ pinch discharge producing magnetic coil means for alternately electrically energizing said magnetic coil means with a discharge current for alternately producing z pinch and θ pinch discharges in said discharge vessel; and further circuit means interconnected with said circuit means for critically attenuating the discharge current of each pinch discharge prior to the provision of the discharge current of the next-succeeding pinch discharge for producing in the plasma in said discharge vessel a magnetic-field-free inertia phase between each pinch discharge and the next-succeeding pinch discharge.

5. Apparatus as claimed in claim 4, wherein said further circuit means comprises resistors coupled across said magnetic coil means.

6. Apparatus as claimed in claim 2, wherein said z pinch discharge producing magnetic coil means comprises a substantially cylindrical slitted current supply member of electrically conductive material.

7. An apparatus as claimed in claim 2, wherein said discharge vessel includes an upper discharge electrode and a lower discharge electrode, each of said discharge electrodes comprising a substantially circular plate having radial slits formed therein.

8. Apparatus for producing and confining high energy plasma in a discharge vessel having a sensing probe, comprising magnetic coil means for producing z pinch discharges in said discharge vessel when electrically energized with a discharge current;

magnetic coil means for producing θ pinch discharges in said discharge vessel when electrically energized with a discharge current;

circuit means connected to said z and θ pinch discharge producing magnetic coil means for alternately electrically energizing said magnetic coil means with a discharge current for alternately producing $n$ z-pinch and θ-pinch discharges in said discharge vessel, where $n$ is a whole number, said circuit means including means connected to said sensing probe for energizing the corresponding magnetic coil means to produce the $n^{th}$ pinch discharge in accordance with the condition of motion of the plasma in said discharge vessel; and further circuit means interconnected with said circuit means for short-circuiting the discharge current of each pinch discharge prior to the provision of the discharge current of the next-succeeding pinch discharge for producing in the plasma in said discharge vessel a magnetic-field-free inertia phase between each pinch discharge and the next-succeeding pinch discharge.

References Cited

UNITED STATES PATENTS

| 2,997,436 | 8/1961 | Little | 313—161 |
| 3,038,099 | 6/1962 | Baker | 313—231 |

JAMES W. LAWRENCE, *Primary Examiner.*

R. JUDD, *Assistant Examiner.*